(12) United States Patent
Iwano et al.

(10) Patent No.: US 11,326,633 B2
(45) Date of Patent: May 10, 2022

(54) JOINT STRUCTURE

(71) Applicant: TOYOTA JIDOSHA KABUSHIKI KAISHA, Toyota (JP)

(72) Inventors: Yoshihiro Iwano, Toyota (JP); Kosuke Sakurai, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 575 days.

(21) Appl. No.: 16/250,389

(22) Filed: Jan. 17, 2019

(65) Prior Publication Data

US 2019/0264718 A1 Aug. 29, 2019

(30) Foreign Application Priority Data

Feb. 26, 2018 (JP) .............................. JP2018-031971

(51) Int. Cl.
*F16B 5/08* (2006.01)
*F16B 5/02* (2006.01)
*B23K 26/22* (2006.01)

(52) U.S. Cl.
CPC ............... *F16B 5/08* (2013.01); *B23K 26/22* (2013.01); *F16B 5/02* (2013.01)

(58) Field of Classification Search
CPC .. F16B 5/02; F16B 5/08; F16B 5/0004; F16B 5/0088; F16B 5/0092; F16B 25/0021; Y10T 403/471; Y10T 403/472; Y10T 403/477; Y10T 403/478; Y10T 403/75
See application file for complete search history.

(56) References Cited

U.S. PATENT DOCUMENTS

| | | | | |
|---|---|---|---|---|
| 1,731,469 A | * | 10/1929 | Mansfield | E04B 1/6104 52/520 |
| 4,888,460 A | * | 12/1989 | Oya | F16B 5/02 219/756 |
| 8,017,887 B2 | * | 9/2011 | Meyer | F16B 5/08 219/121.64 |
| 8,820,804 B2 | * | 9/2014 | Shibata | B60D 1/56 293/117 |
| 8,857,040 B2 | * | 10/2014 | Freis | F16B 5/02 29/525.11 |
| 8,925,991 B2 | * | 1/2015 | Caliskan | B62D 27/065 296/29 |

(Continued)

FOREIGN PATENT DOCUMENTS

| CN | 1350903 A | 5/2002 |
|---|---|---|
| CN | 104625494 A | 5/2015 |

(Continued)

*Primary Examiner* — Josh Skroupa
(74) *Attorney, Agent, or Firm* — Oliff PLC

(57) ABSTRACT

A joint structure includes: a first steel plate; a second steel plate disposed along the first steel plate; a laser welding part that joins together a joint face part, which configures a first part of the first steel plate, and the second steel plate from one side in a plate thickness direction of the first steel plate and the second steel plate; and a fastening member that is screwed into, and fastens together, the second steel plate and a general face part from the one side in the plate thickness direction, the general face part configuring a second part of the first steel plate, being provided adjacent to the joint face part, and being disposed so as to be spaced apart from the second steel plate at the one side in the plate thickness direction.

2 Claims, 3 Drawing Sheets

(56) References Cited

U.S. PATENT DOCUMENTS

| | | | |
|---|---|---|---|
| 9,012,006 B2* | 4/2015 | Fisk | B32B 3/06 |
| | | | 428/131 |
| 9,567,012 B2* | 2/2017 | Oshima | B62D 21/157 |
| 9,764,766 B2* | 9/2017 | Yoshida | B62D 21/157 |
| 9,809,100 B2* | 11/2017 | Kamimura | B62D 21/157 |
| 9,956,859 B2* | 5/2018 | Ikeda | B60K 1/04 |
| 10,099,546 B2* | 10/2018 | Hara | B60K 1/04 |
| 10,421,497 B2* | 9/2019 | Takii | B62D 25/081 |
| 10,583,868 B2* | 3/2020 | Murata | B23K 20/129 |
| 2012/0313399 A1* | 12/2012 | Caliskan | B62D 25/20 |
| | | | 296/193.01 |
| 2015/0209909 A1* | 7/2015 | Shimada | B23K 26/32 |
| | | | 403/271 |
| 2019/0161128 A1* | 5/2019 | Abke | B62D 29/008 |

FOREIGN PATENT DOCUMENTS

| | | | | |
|---|---|---|---|---|
| JP | S52-081571 U | | 6/1977 | |
| JP | 2002-019636 A | | 1/2002 | |
| JP | 2004082136 A | * | 3/2004 | ............ F16B 11/006 |
| JP | 2015-033706 A | | 2/2015 | |
| JP | 2017-210155 A | | 11/2017 | |

\* cited by examiner

JOINT STRUCTURE

CROSS-REFERENCE TO RELATED APPLICATION

This application is based on and claims priority under 35 USC 119 from Japanese Patent Application No. 2018-031971 filed on Feb. 26, 2018, the disclosure of which is incorporated by reference herein.

BACKGROUND

Technical Field

The present disclosure relates to a joint structure.

Related Art

Japanese Patent Application Laid-open (JP-A) No. 2015-33706 discloses an invention related to a spot-laser composite welded joint. With this spot-laser composite welded joint, two overlaid steel plates are joined together by plural spot welding parts and by laser welding parts disposed between adjacent spot welding parts. Further, a gap between the steel plates is set at 0.2 mm or lower, and the strength of the laser welding parts can be secured.

Advantages of laser welding include the fact that it is possible to weld together plural steel sheets by means of a welding operation from one side in a plate thickness direction of the steel plates. On the other hand, disadvantages of laser welding include the fact that it can be difficult to secure the strength of a laser welding spot when there is a large gap between the steel plates. As regards this point, in the above-described JP-A No. 2015-33706, two steel plates are joined together by spot welding parts, and having thus suppressed the occurrence of gaps between these steel plates, the steel plates are joined together at laser welding parts.

However, in JP-A No. 2015-33706, spot welding is performed as described above, and since, therefore, it is necessary to interpose the steel plates between electrode tips, these steel plates cannot be joined together by means of a welding operation from only one side in a plate thickness direction of the steel plates. That is, in JP-A No. 2015-33706, there is room for improvement from the perspective of securing the strength of the laser welding part while also joining together the two steel plates with an operation from only one side in the plate thickness direction of the steel plates.

SUMMARY

The present disclosure considers the circumstances described above and aims to provide a joint structure that can secure the strength of a laser welding part while also joining together two steel plates with an operation from only one side in the plate thickness direction of the steel plates.

A joint structure of a first aspect of the present disclosure includes: a first steel plate; a second steel plate disposed along the first steel plate; a laser welding part that joins together a joint face part, which configures a first part of the first steel plate, with the second steel plate, from one side in a plate thickness direction of the first steel plate and the second steel plate; and a fastening member that is screwed into, and fastens together, the second steel plate and a general face part, from the one side in the plate thickness direction, the general face part configuring a second part of the first steel plate, being provided adjacent to the joint face part, and being disposed so as to be spaced apart from the second steel plate at the one side in the plate thickness direction.

According to the joint structure of the first aspect of the present disclosure, a second steel plate is disposed along a first steel plate. The first steel plate is provided with a joint face part and a general face part, which configure respective parts of the first steel plate, and the joint face part is joined to the second steel plate from one side in the plate thickness direction of the first steel plate and the second steel plate by means of a laser welding part. Further, the general face part of the first steel plate is fastened to the second steel plate by means of a fastening member. Therefore, in the present aspect, the first steel plate and the second steel plate can be joined together by means of a laser welding part in a state in which the first steel plate and the second steel plate are positioned relative to each other by a fastening member.

Further, the fastening member can be screwed into the general face part of the first steel plate and into the second steel plate and can fasten together the general face part and the second steel plate from the one side in the plate thickness direction. Therefore, in the present aspect, the first steel plate and the second steel plate can be joined together with an operation from only the one side in the plate thickness direction.

Incidentally, it is thought that if the general face part of the first steel plate and the second steel plate are fastened together by the fastening member in a state in which the general face part and the second steel plate are in close contact with each other, a burr portion will be produced between the general face part and the second steel plate due to the fastening member being screwed into the first steel plate and the second steel plate. Further, owing to this burr portion, a gap will be produced between the general face part of the first steel plate and the second steel plate, and therefore, a gap will also be produced between the joint face part of the first steel plate and the second steel plate, and it is thought that it will be difficult to secure the strength of the laser welding part.

Here, in the present aspect, the general face part of the first steel plate is disposed so as to be separated from the second steel plate at the one side in the plate thickness direction. Therefore, the burr portion produced by the fastening member fits between the general face part of the first steel plate and the second steel plate and it is possible to suppress the occurrence of a gap between the first steel plate and the second steel plate due to the burr portion. As a result, in the present aspect, the joint face part of the first steel plate and the second steel plate can be joined together at the laser welding part in a state in which the occurrence of a gap between the first steel plate and the second steel plate has been suppressed, and the strength of the laser welding part can be secured.

In a joint structure of a second aspect of the present disclosure, the general face part of the joint structure of the first aspect includes a seating face part at which a part of the general face part protrudes toward the one side in the plate thickness direction, and the fastening member is fastened at the seating face part.

According to the joint structure of the second aspect of the present disclosure, the fastening member is fastened at a seating face part, at which a part of the general face part protrudes toward the one side in the plate thickness direction of the first steel plate and the second steel plate, and the space in which the burr portion produced by the fastening member fits can be more broadly secured. Further, the axial force of the fastening member can be supported by the seating face part, and the influence of this axial force on the first steel plate can be suppressed.

As described in the foregoing, the joint structure of the first aspect of the present disclosure has the superior effect whereby the strength of a laser welding part can secured while also joining together two steel plates with an operation from only one side in the plate thickness direction of the steel plates.

The joint structure of the second aspect of the present disclosure has the superior effect whereby an influence on the laser welding part and the steel plates due to fastening with the fastening member can be reduced.

BRIEF DESCRIPTION OF THE DRAWINGS

Exemplary embodiments of the present disclosure will be described in detail based on the following figures, wherein.

DETAILED DESCRIPTION

Figure 1:
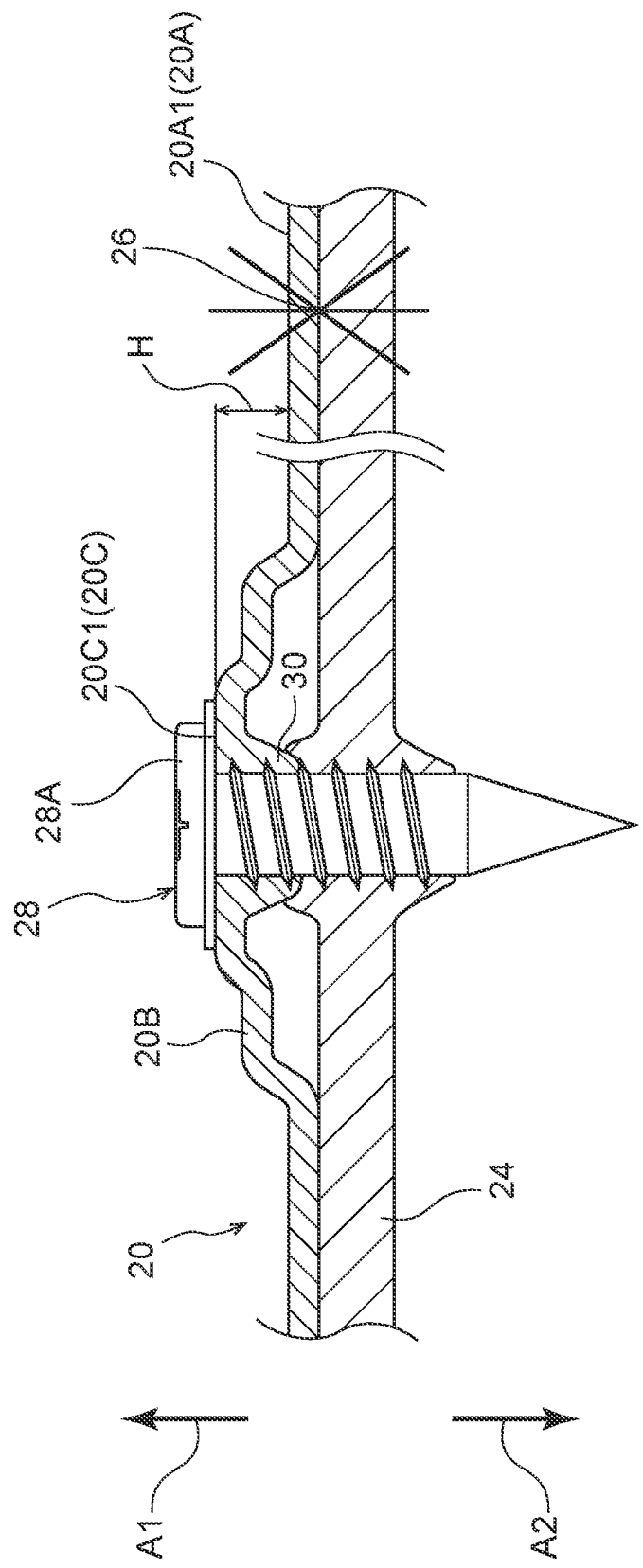
FIG. 1 is an enlarged sectional view (an enlarged view of the portion enclosed by a double-dotted-dashed line in FIG. 2) showing the configuration of a major portion of a rocker to which a joint structure according to the present exemplary embodiment has been applied.

In the following, an example of a joint structure according to the present exemplary embodiment is explained using FIGS. 1 to 3. First, the basic configuration of rocker 10, to which the joint structure according to the present exemplary embodiment has been applied, is explained using FIG. 3.

Rocker 10 is configured by rocker outer 14, which is made of steel and configures a portion at an outer side in a vehicle width direction in a state in which rocker 10 is provided at vehicle 12, and by rocker inner 16, which is made of steel and configures a portion at an inner side in the vehicle width direction in a state in which rocker 10 is provided at vehicle 12. Rocker outer 14 is configured by main body part 18, which configures a main portion of rocker outer 14 and has a sectional shape formed in a substantial U-shape as viewed from a longitudinal direction, and by a pair of plate-shaped flange parts 20 (a first steel plate), which extend outward from main body part 18 and extend along the longitudinal direction of main body part 18.

Rocker inner 16 is configured by main body part 22, which configures a main portion of rocker inner 16 and has a sectional shape formed in a substantial U-shape as viewed from a longitudinal direction, and by a pair of plate-shaped flange parts 24 (a second steel plate), which extend outward from main body part 22 and extend along the longitudinal direction of main body part 22. Further, by joining together flange parts 20 of rocker outer 14 and flange parts 24 of rocker inner 16, rocker 10 has a closed sectional configuration whereby the sectional shape of rocker 10 as viewed from the longitudinal direction is a closed cross-section. It should be noted that in FIGS. 1 to 3, one side in a plate thickness direction of flange parts 20, 24 is indicated by arrow A1 and the other side in the plate thickness direction of flange parts 20, 24 is indicated by arrow A2. Further, in FIG. 3, the one side in the plate thickness direction of flange parts 20, 24 corresponds to the outer side in the vehicle width direction, and the other side in the plate thickness direction of flange parts 20, 24 corresponds to the inner side in the vehicle width direction. Further, unless otherwise indicated, the plate thickness direction of flange parts 20, 24 is simply referred to as "the plate thickness direction".

Figure 2:
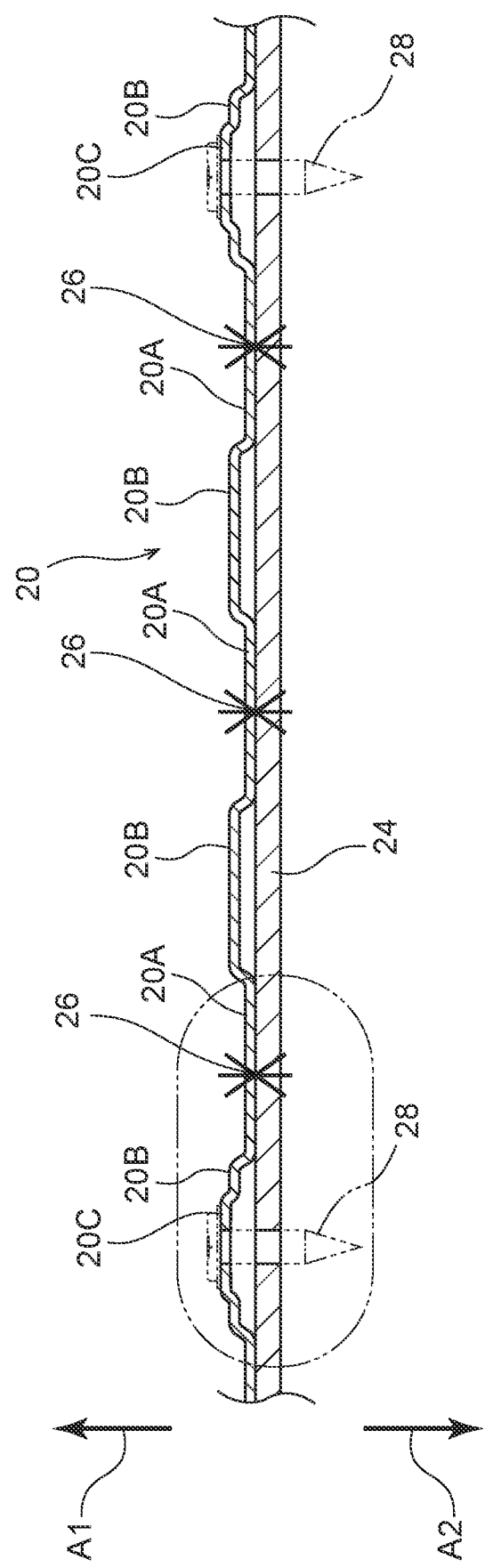
FIG. 2 is a sectional view (a sectional view showing a state cut along line 2-2 in FIG. 3) showing the configuration of a joint part between a rocker outer and a rocker inner in a rocker to which the joint structure according to the present exemplary embodiment has been applied.
Figure 3:
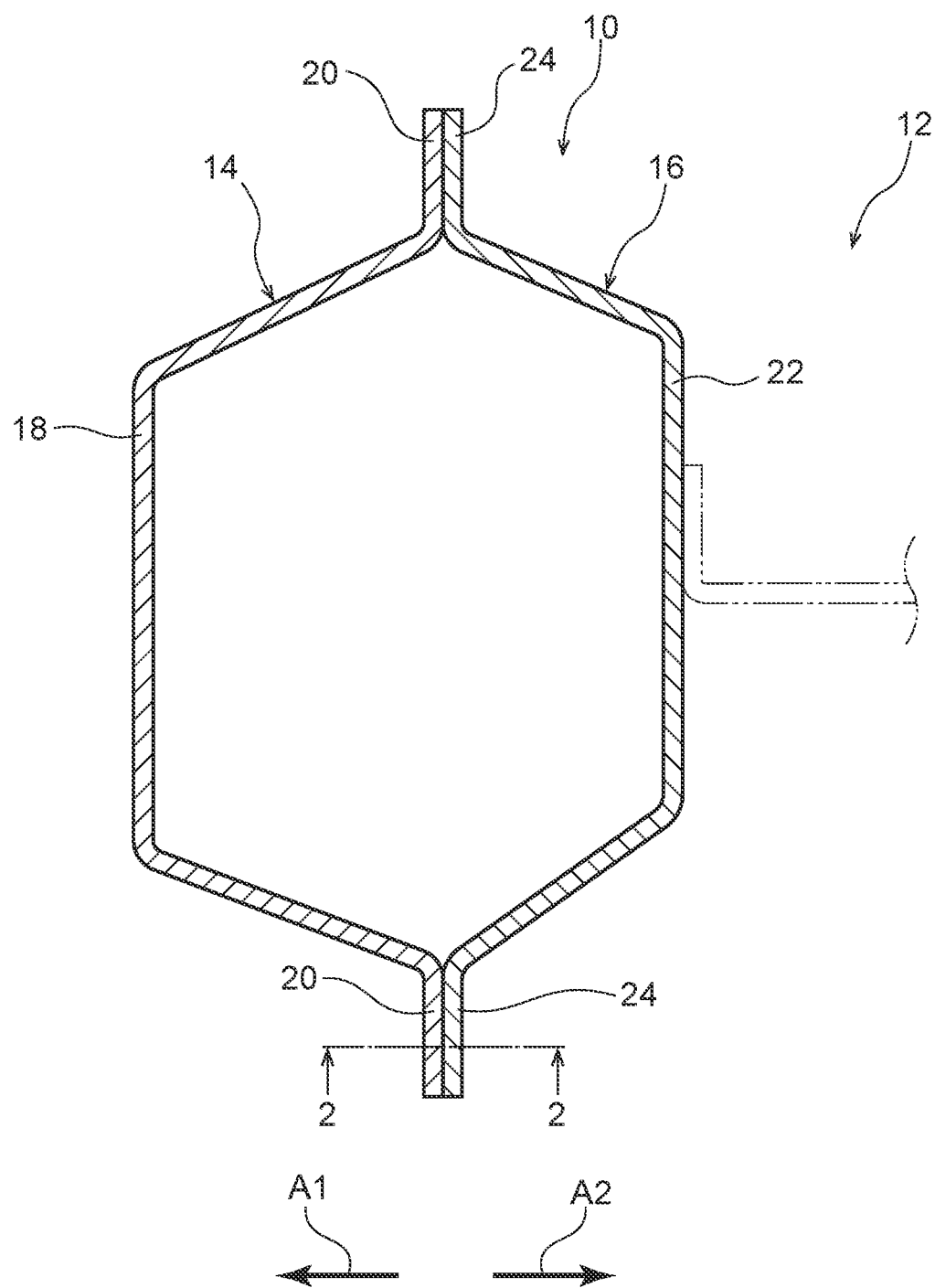
FIG. 3 is a sectional view, viewed from a longitudinal direction of the rocker, showing the configuration of a rocker to which the joint structure according to the present exemplary embodiment has been applied.

Here, in the present exemplary embodiment, as shown in FIG. 1 and FIG. 2, the joint structure according to the present exemplary embodiment is applied to flange parts 20, 24. In the following, the joint structure between flange part 20 and flange part 24, which is the principal portion of the present exemplary embodiment, is explained in detail.

First, the configuration of flange part 20 is explained in further detail. Flange part 20 is configured by joint face part 20A and general face part 20B, which is provided adjacent to joint face part 20A. Joint face part 20A is disposed at plural locations along a longitudinal direction of flange part 20, and is provided along flange part 24 in a state of proximity to flange part 24, which extends uniformly along the longitudinal direction of rocker 10. Further, joint face part 20A is joined to flange part 24 at laser welding part 26 by laser welding from the one side in the plate thickness direction.

General face part 20B is disposed in a state of being separated from flange part 24 at the one side in the plate thickness direction and in a state whereby a fixed interval is maintained relative to flange part 24 along the longitudinal direction of rocker 10. General face part 20B is provided uniformly in a direction orthogonal to the longitudinal direction of rocker 10 in flange part 20, and when general face part 20B is taken as the point of reference, the above-described joint face part 20A is configured in a state that is recessed toward the side of flange part 24.

Further, in the present exemplary embodiment, seating face part 20C is provided at plural of general face parts 20B; for example, at every third general face part 20B arranged along the longitudinal direction of flange part 20.

As shown in FIG. 1, seating face part 20C is provided such that a part of general face part 20B protrudes toward the one side in the plate thickness direction, and is formed in a circular shape as viewed from the plate thickness direction. Further, seating face 20C1, which is a face of seating face part 20C at the one side in the plate thickness direction, is formed in parallel with welding face 20A1, which is a face of joint face part 20A at the one side in the plate thickness direction, and distance H in the plate thickness direction between seating face 20C1 and welding face 20A1 is set such that: 0.5 mm≤H≤1.0 mm.

Further, at seating face 20C1 of seating face part 20C, tapping screw 28 is threaded in as a fastening member from the one side in the plate thickness direction, and tapping screw 28 is thus screwed into seating face part 20C and flange part 24 and fastens seating face part 20C to flange part 24 from the one side in the plate thickness direction. It should be noted that the diameter of seating face 20C1 as viewed from the plate thickness direction is larger than the diameter of head part 28A of tapping screw 28.

Mechanism and Effect of the Present Exemplary Embodiment

Next, the mechanism and effect of the present exemplary embodiment are explained.

In the present exemplary embodiment, as shown in FIG. 1, flange part 24 is disposed along flange part 20. Flange part 20 is provided with joint face part 20A and general face part 20B, which configure respective parts of flange part 20, and joint face part 20A is joined to flange part 24 at laser welding part 26 from the one side in the plate thickness direction. Further, general face part 20B of flange part 20 is fastened to flange part 24 by tapping screw 28. Therefore, in the present exemplary embodiment, flange part 20 and flange part 24 can be joined together by laser welding part 26 in a state in which flange part 20 and flange part 24 are positioned relative to each other by tapping screw 28.

Further, tapping screw 28 can be screwed into general face part 20B of flange part 20 and flange part 24 and can fasten together general face part 20B and flange part 24 from the one side in the plate thickness direction. Therefore, in the present exemplary embodiment, flange part 20 and flange part 24 can be joined together by operations from only the one side in the plate thickness direction.

Incidentally, it is thought that if general face part 20B of flange part 20 and flange part 24 are fastened together by tapping screw 28 in a state in which general face part 20B and flange part 24 are in close contact with each other, a burr portion will be produced between general face part 20B and flange part 24 due to tapping screw 28 being screwed into flange part 20 and flange part 24. Further, owing to this burr portion, a gap will be produced between general face part 20B of flange part 20 and flange part 24, and therefore, a gap will also be produced between joint face part 20A of flange part 20 and flange part 24, and it is thought that it will be difficult to secure the strength of laser welding part 26.

Here, in the present exemplary embodiment, general face part 20B of flange part 20 is disposed so as to be separated from flange part 24 at the one side in the plate thickness direction. Therefore, burr portion 30 produced by tapping screw 28 fits between general face part 20B of flange part 20 and flange part 24 and it is possible to suppress the occurrence of a gap between flange part 20 and flange part 24 due to burr portion 30. As a result, in the present exemplary embodiment, joint face part 20A of flange part 20 and flange part 24 can be joined together at laser welding part 26 in a state in which the occurrence of a gap between flange part 20 and flange part 24 has been suppressed, and the strength of laser welding part 26 can be secured. Accordingly, in the present exemplary embodiment, the strength of laser welding part 26 can be secured and the two steel plates can be joined together by operations from only the one side in the plate thickness direction of the steel plates—that is, of flanges 20, 24.

Further, in the present exemplary embodiment, tapping screw 28 is fastened at seating face part 20C, which is formed by a part of general face part 20B of flange part 20 protruding toward the one side in the plate thickness direction, and the space in which burr portion 30 produced by tapping screw 28 fits can be more broadly secured. Further, the axial force of tapping screw 28 can be supported by seating face part 20C, and the influence of this axial force on flange part 20 can be suppressed. Accordingly, in the present exemplary embodiment, it is possible to reduce the influence due to the fastening of tapping screw 28 relative to laser welding part 26 and flanges 20, 24.

Supplementary Explanation of the Above-Described Exemplary Embodiment (1) In the above-described exemplary embodiment, tapping screw 28 is fastened at general face part 20B at which seating face part 20C is provided; however, in accordance with the processing accuracy and the like of flange part 20, tapping screw 28 may be fastened at general face part 20B at which seating face part 20C is not provided.

(2) Further, in the above-described exemplary embodiment, seating face part 20C is provided at flange part 20; however, in accordance with the specifications or the like of tapping screw 28, a configuration may be adopted in which seating face part 20C is not provided at flange part 20. In addition, insofar as it is possible to screw (cut) into flange part 20 and flange part 24, a fastening member other than tapping screw 28 may be used to fasten flange part 20 to flange part 24.

What is claimed is:

1. A joint structure, comprising:
a first steel plate;
a second steel plate disposed along the first steel plate;
a laser welding part that joins together a joint face part, which configures a first part of the first steel plate, with the second steel plate, from one side in a plate thickness direction of the first steel plate and the second steel plate; and
a fastening member that is screwed into, and fastens together, the second steel plate and a general face part, by screw cutting the general face part and the second steel plate from the one side in the plate thickness direction, the general face part configuring a second part of the first steel plate, being provided adjacent to the joint face part, being disposed so as to be spaced apart from the second steel plate at the one side in the plate thickness direction, and comprising a seating face part at which a part of the general face part protrudes toward the one side in the plate thickness direction, the fastening member being fastened at the seating face part.

2. A joint structure, comprising:
a first steel plate;
a second steel plate disposed along the first steel plate;
a laser welding part that joins together a joint face part, which configures a first part of the first steel plate, with the second steel plate, from one side in a plate thickness direction of the first steel plate and the second steel plate;
a fastening member that is screwed into, and fastens together, the second steel plate and a general face part, by screw cutting the general face part and the second steel plate from the one side in the plate thickness direction, the general face part configuring a second part of the first steel plate, being provided adjacent to the joint face part, being disposed so as to be spaced apart from the second steel plate at the one side in the plate thickness direction, and comprising a seating face part at which a part of the general face part protrudes toward the one side in the plate thickness direction, the fastening member being fastened at the seating face part; and
a burr portion produced by screw cutting the general face part and the second steel plate by the fastening member that fits between the general face part and the second steel plate.

* * * * *